(12) United States Patent
Runkel

(10) Patent No.: US 10,730,121 B2
(45) Date of Patent: Aug. 4, 2020

(54) DEVICE FOR CHANGING A BLADE ON SHEARS, IN PARTICULAR FOR A ROLLED BAND, AND SHEARS WITH AT LEAST ONE REPLACEABLE BLADE

(71) Applicant: SMS GROUP GMBH, Düsseldorf (DE)

(72) Inventor: Thomas Runkel, Siegen (DE)

(73) Assignee: SMS GROUP GMBH, Düsseldorf (DE)

( * ) Notice: Subject to any disclaimer, the term of this patent is extended or adjusted under 35 U.S.C. 154(b) by 152 days.

(21) Appl. No.: 15/580,222

(22) PCT Filed: Jun. 8, 2016

(86) PCT No.: PCT/EP2016/063032
§ 371 (c)(1),
(2) Date: Dec. 6, 2017

(87) PCT Pub. No.: WO2016/198451
PCT Pub. Date: Dec. 15, 2016

(65) Prior Publication Data
US 2018/0147643 A1 May 31, 2018

(30) Foreign Application Priority Data

Jun. 10, 2015 (DE) .................. 10 2015 210 640
Nov. 11, 2015 (DE) .................. 10 2015 222 181

(51) Int. Cl.
*B23D 35/00* (2006.01)
*B23D 25/12* (2006.01)

(52) U.S. Cl.
CPC ........... *B23D 35/008* (2013.01); *B23D 25/12* (2013.01); *B23D 35/002* (2013.01)

(58) Field of Classification Search
CPC .... B23D 35/00; B23D 35/001; B23D 35/002; B23D 35/004; B23D 35/005; B23D 35/007; B23D 35/008; B23D 25/00; B23D 25/12
See application file for complete search history.

(56) References Cited

U.S. PATENT DOCUMENTS 1,031,528 A * 7/1912 Cole .................. F15B 11/0365
91/533
2,180,204 A 11/1939 Hallden
(Continued)

FOREIGN PATENT DOCUMENTS

CN 202571456 U 12/2012
CN 103722233 U 4/2014
(Continued)

OTHER PUBLICATIONS

English Translation of Korean Office Action, dated Mar. 27, 2019, 17 Pages.

*Primary Examiner* — Jason Daniel Prone
*Assistant Examiner* — Richard D Crosby, Jr.
(74) *Attorney, Agent, or Firm* — Lucas & Mercanti, LLP; Klaus P. Stoffel

(57) ABSTRACT

A device for changing a blade on shears, in particular for a rolled band, and to such shears in which a blade can be fixed to at least one blade support automatically by a tie bar pretensioned by a force accumulator. The device includes at least one adjusting element which can be actuated in order to release the blade from the blade support such that the tie rod is moved in an axial direction against the tie rod pretension. The adjusting element can be arranged on an outer face of the blade support or outside of the blade support.

19 Claims, 13 Drawing Sheets

(56) References Cited

U.S. PATENT DOCUMENTS

| | | | | |
|---|---|---|---|---|
| 2,246,834 | A | * | 6/1941 | Bowman ............ F16B 13/0808 411/342 |
| 2,660,242 | A | | 11/1953 | Lane |
| 3,948,133 | A | * | 4/1976 | Diehm .................. B26D 1/28 83/556 |
| 4,590,846 | A | * | 5/1986 | Stoll .................. F15B 15/1438 92/151 |
| 4,638,699 | A | * | 1/1987 | Schroder ............. B23D 23/00 83/452 |
| 4,915,553 | A | * | 4/1990 | Lazarevic ........... B23B 31/263 408/56 |
| 4,920,843 | A | | 5/1990 | Strömberg et al. |
| 5,146,831 | A | * | 9/1992 | Fetter, Jr. ........... B23D 35/008 411/341 |
| 5,363,729 | A | * | 11/1994 | Ogasawara .......... B21D 43/22 83/389 |
| 5,857,396 | A | * | 1/1999 | Strouse, Jr. ......... B23D 35/008 384/255 |
| 5,904,086 | A | | 5/1999 | Figge et al. |
| 6,332,765 | B1 | * | 12/2001 | Spelleken ............ B29B 9/065 264/142 |
| 2008/0087155 | A1 | * | 4/2008 | Merz .................. B23D 35/002 83/743 |
| 2018/0147643 | A1 | * | 5/2018 | Runkel ................ B23D 25/12 |

FOREIGN PATENT DOCUMENTS

| | | |
|---|---|---|
| CN | 203696104 U | 7/2014 |
| DE | 1502685 B1 | 10/1970 |
| DE | 3030744 A1 | 2/1982 |
| DE | 3423275 A1 | 1/1986 |
| DE | 9204618 U1 | 5/1992 |
| DE | 19542173 A1 | 5/1997 |
| DE | 19749170 A1 | 5/1999 |
| EP | 1603716 B1 | 12/2013 |
| GB | 2332165 A9 | 6/1999 |
| JP | S5577413 A | 6/1980 |
| JP | 2004-314261 A | 11/2004 |
| JP | 2004314261 A | 11/2004 |
| JP | 200830134 A | 8/2009 |
| WO | 2006058759 A1 | 6/2006 |

* cited by examiner

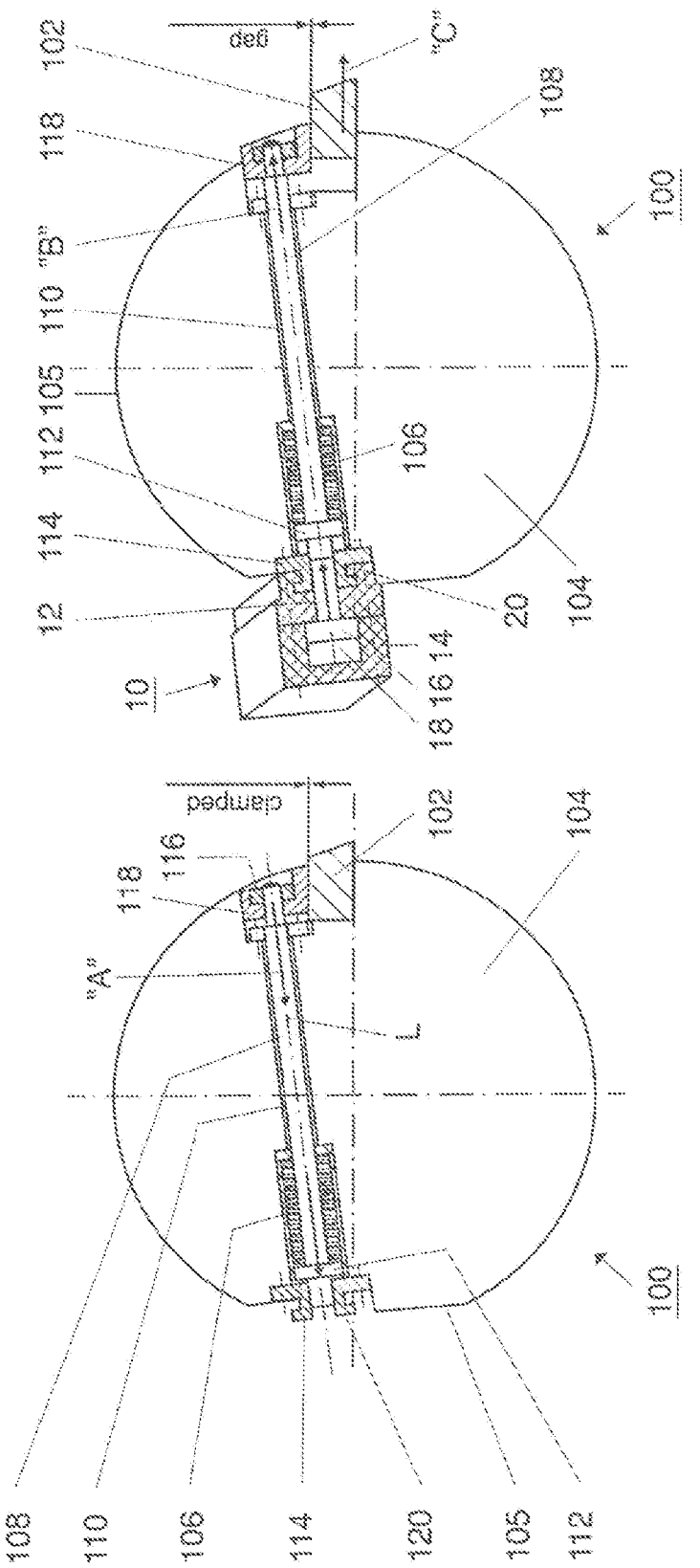

US 10,730,121 B2

DEVICE FOR CHANGING A BLADE ON SHEARS, IN PARTICULAR FOR A ROLLED BAND, AND SHEARS WITH AT LEAST ONE REPLACEABLE BLADE

The present application is a 371 of International application PCT/EP2016/063032, filed Jun. 8, 2016, which claims priority of DE 10 2015 210 640.3, filed Jun. 10, 2015 and DE 10 2015 222 181.4, filed Nov. 11, 2015. The priority of these applications is hereby claimed and these applications are incorporated herein by reference.

BACKGROUND OF THE INVENTION

The invention relates to a device for changing a blade on shears, in particular for a rolled band and to such shears.

In the case of shears for cutting or cross cutting a rolled band, the blades attached to the shears generally have to be changed because the blades are subject to severe wear during operation of the shears. Accordingly, the fastenings with which the blades are attached to the shears can be released in order to suitably exchange the blades.

In the prior art, blade fastenings in the form of screws of screw bolts, which can be simply released for replacing the blades, are known for shears of this type. However, such fastening means are subject to the following disadvantages: because of the action of heat and media during operation of the shears, the screws or screw bolts can have a tendency to stick after quite some operating time, and therefore the changing of the blades is time-consuming. After tightening of the fastening screws, a blade settles after a number of cuts by the shears, and therefore the screws lose the necessary tensioning for clamping the blade. Finally, a further disadvantage of such blade fastenings consists in that the screws or screw bolts are generally handled manually, which leads to long reequipping times with correspondingly high costs.

In order to avoid the above disadvantages, solutions are conventionally known in which the blades are fastened to a blade carrier of the shears with spring elements, preferably in the form of disk springs, wherein pretensioning of the spring elements brings about automatic clamping of the blades on the blade carrier. The tensioning for clamping the blades always stays constant here, with it simultaneously also being possible to avoid sticking of screw elements or the like.

The blades can be released from the blade carrier of the shears hydraulically using hydraulic cylinders, as a result of which changing of the blades is advantageously possible in a short time.

According to the prior art, for example in DE 34 23 275 A1, DE 30 30 744 A1 or CN 202 57 14 56 U, the use of hydraulic cylinders in drum shears is known, wherein the hydraulic cylinders are arranged within a blade drum of the drum shears. A disadvantage in this connection is that the release force of the hydraulic cylinders installed in the blade drum is restricted because of the small structural dimensions, as are the clamping forces of the spring elements, for the same reason. Furthermore, the seals of the hydraulic cylinders are heat-sensitive, and therefore the blades and the blade drums have to be cooled in a complicated manner in order to restrict component temperatures. Further disadvantages consist in that the necessary bores for supplying hydraulic oil to the hydraulic cylinders within the blade drum have to be produced in a complicated manner, and that the connections for the hydraulic oil to the hydraulic cylinders have to be made in a complicated manner on the outer side of the shears.

SUMMARY OF THE INVENTION

Accordingly, the invention is based on the object of structurally simplifying the changing of a blade on shears, in particular for a rolled band, and configuring same in a time-saving manner.

A device according to the present invention serves for changing a blade on shears, in particular for a rolled band, wherein, in the case of shears of this type, a blade can be automatically secured on a blade carrier of the shears by a tie rod which is pretensioned by means of a force accumulator. The device according to the invention comprises at least one adjusting member which, for releasing the blade from the blade carrier, is actuable in such a manner that the tie rod is thereby moved in an axial direction in a manner opposed to the pretensioning thereof. In this case, the adjusting member can be arranged on an outer side of the blade carrier or outside the blade carrier.

The invention is based on the substantial finding that, by means of positioning the adjusting member either on the outer side of the blade carrier or entirely outside the blade carrier, the temperatures arising during operation of the shears have little, if any, effect on the adjusting member, and therefore damage to the adjusting member as a consequence of temperatures which are too high is prevented. At the same time, the invention ensures a simple and reliable fastening of a blade to a blade carrier, with the simultaneous possibility of a rapid change of the blade. A further advantage consists in that higher release forces can be transmitted to the tie rod of the shears by an adjusting member, which is arranged outside the blade carrier, because there are no structural restrictions with regard to the adjusting member here. In the same manner, by omission of hydraulic cylinders within the blade carrier, the installation space for a force accumulator acting on the tie rod, for example in the form of disk springs or the like, is increased, and therefore the clamping force for securing the blades on the blade carrier can be increased, for example by installing larger and therefore more powerful disk springs—as force accumulators for generating the pretensioning acting on the tie rod—in the blade carrier.

The blade is released in such a manner that, by means of the adjusting member, a compressive force or a tensile force is exerted on the tie rod in order to be able to neutralize the pretensioning thereof and then to release the blade from the blade carrier.

In an advantageous development of the invention, as preparation for carrying out a change of blades in shears, the adjusting member can be temporarily attached to the blade carrier of the shears. This has the advantage that, after the change of blades has finished, the adjusting member is released again from the blade carrier and is not connected to the blade carrier during normal operation of the shears. In the same manner, it is possible also to connect a connecting rod, which is operatively connected to the adjusting member, temporarily to the blade carrier when a change of blades is intended to be carried out.

In an advantageous development of the invention, the adjusting member can be fastened, preferably in a form-fitting manner, to a contact block located on the outer side of the blade carrier. This ensures an operationally reliable and rapid fastening of the adjusting member to the outer side of the blade carrier, in particular for the situation when, as explained above, the adjusting member is merely attached temporarily to the blade carrier in order to carry out a change of blade.

In an advantageous development of the invention, the adjusting member can be designed as a hydraulic cylinder, as a result of which a high force density in a small space is ensured and therefore high release force are possible in order to move the tie rod of the shears in its axial direction counter to the pretensioning of the force accumulator. If an adjusting member in the form of a hydraulic cylinder is merely attached temporarily to the blade carrier, the advantage also arises that the hydraulic cylinder, when the latter is removed from the blade carrier, can be serviced in the workshop in a simple manner outside the production line.

According to an alternative embodiment of the invention, the adjusting member can also function purely mechanically and can be designed in this connection in the form of a screw. If a contact block is provided on an outer side of the blade carrier, such a screw can be brought into engagement with an internal thread of the contact block in order then to act with its end side on the tie rod within the blade carrier, namely in order to release the blade from the blade carrier. By means of the use of purely mechanical adjusting members instead of hydraulic cylinders, the investment and servicing costs for the invention are considerably reduced.

The present invention also relates to shears with at least one replaceable blade, wherein the shears can be used in conjunction with the above-explained device for changing a blade. Shears of this type comprise a blade carrier on which the blade can be automatically secured by a tie rod which is pretensioned by means of a force accumulator. The blade is then released by actuation of the adjusting member of the device according to the invention, wherein, by actuation of the adjusting member, the tie rod is moved in an axial direction in an opposed manner to the pretensioning thereof and, as a result, clamping of the blade on the blade carrier is overridden.

In an advantageous development of the invention, the blade carrier of the shears has, on its outer side and as an extension of the longitudinal axis of the tie rod, at least one contact block to which the adjusting member of the device, or alternatively a connecting rod coupleable to the adjusting member, can be fastened, preferably in a form-fitting manner. It is thereby possible to fasten the adjusting member or a connecting rod coupleable to the adjusting member to the outer side of the blade carrier in a short time and subsequently to release same again therefrom. When the adjusting member is fastened to the contact block, the latter takes on the function that, upon actuation of the adjusting member and the compressive force which is generated by this means and acts on the tie rod in the direction of the longitudinal axis thereof, the required counterforce is supported in or introduced into the blade carrier. The same applies for the case in which it is not the adjusting member itself, but rather instead a connecting rod which is coupleable to the adjusting member which is fastened to the contact block.

In an advantageous development of the invention, the shears according to the invention can be rotating shears, wherein the blade carrier is designed as a blade drum. With respect to a rotation of the blade drum, it is of great advantage if, as explained above, the adjusting member is only temporarily attached to the outer side of the blade carrier, for changing a blade, but, during normal operation of the shears, is removed from the blade carrier or from the blade drum. Accordingly, fewer imbalances then arise during rotation of the blade drum, with control lines or the like which lead to the blade drum not being required.

The invention can expediently be used with drum shears in a hot band mill for producing flat-rolled steel, wherein a rolled band is cut with such drum shears. In particular, the invention can be used for endless rolling plants, since, by means of the continuous operation, there is a high action of heat here on the blade and blade carrier which prevents the use of hydraulic blade clamps according to the prior art because of the damage to the seals as a consequence of the high temperature. Nevertheless, the invention is also suitable for installation in other types of shears, such as crank shears, pendulum shears or circular blade shears.

It should be pointed out that the invention is suitable for any type of shears in which at least one blade is fastened to a blade carrier by clamping, wherein the fastening means for exchanging the blade are configured releasably, namely by actuation of an adjusting member suitable for this purpose. An operationally reliable and low-maintenance design of a blade fastening is ensured at any rate by means of the invention.

In an advantageous development of the invention, all of the seals in the tensioning system can be realized as a metallic seal. This leads to the advantage that damage or even destruction of the seals as a consequence of the action of heat is avoided.

Exemplary embodiments of the invention are described in detail below with reference to a schematically simplified drawing.

BRIEF DESCRIPTION OF THE DRAWINGS

In the drawing:

FIG. 1 shows a simplified lateral cross-sectional view of shears according to the present invention, FIG. 2 shows a simplified lateral cross-sectional view of the shears from FIG. 1 in conjunction with a device according to the present invention for changing a blade on shears.

FIG. 6a,

DETAILED DESCRIPTION OF THE INVENTION

Figure 3:
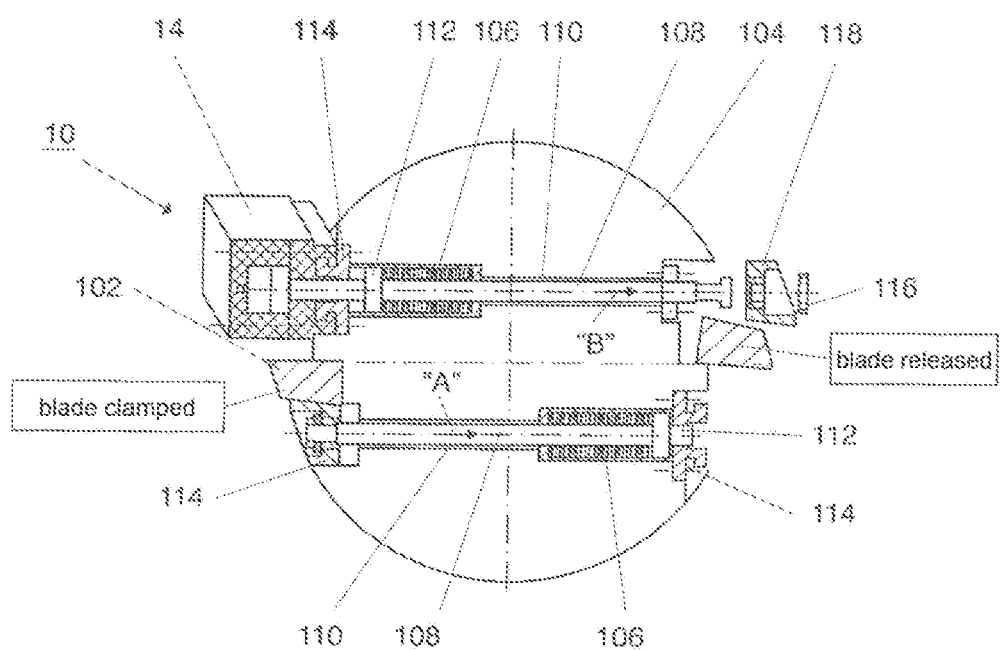
FIG. 3 shows a simplified lateral cross-sectional view of a device according to the invention for changing a blade of shears according to a further embodiment.

FIG. 1 shows a simplified lateral cross-sectional view of shears 100 according to the present invention, in which at least one blade 102 can be fastened to a blade carrier 104 by clamping. The shears 100 can be designed as rotating shears, wherein the blade carrier 104 is then a rotating blade drum. The blade 102 is clamped to the blade drum 104 by means of a force accumulator 106, by means of which a tie rod 108 acting on the blade 102 is pretensioned. The force accumulator 106 is preferably designed in the form of disk springs, and is always only referred to below as a disk spring without a restriction to this type of force accumulator being thereby understood.

A bore 110 is formed in the blade drum 104 in order to accommodate the disk spring 106 and the tie rod 108 therein. The disk spring 106 is attached to an end of the tie rod 108, wherein a base element 112 is fastened to an end side of the tie rod 108 adjacent to the disk spring 106, said base element lying against a contact block 114 provided on an outer side 105 of the blade drum 104. A clamping piece 118 which can be brought into interaction with the blade 102 is attached to the opposite end side of the tie rod 108 by means of a screw 116.

A pretensioning, symbolized in FIG. 1 by the arrow "A", is exerted on the tie rod 108 by means of the disk spring 106. This pretensioning causes the clamping piece 118 to enter into contact with the blade 102, as a result of which the blade 102 is secured or clamped on the blade drum 104.

In the case of the shears 100 according to FIG. 1, the blade 102 is automatically secured on the blade drum 104 by the tie rod 108 which is pretensioned by means of the disk spring 106. Rotation of the blade drum 104 is facilitated according to the invention by means for releasing or changing the blade 102 not being attached permanently to the blade drum 104. Accordingly, it is also not required to provide control lines or the like for the rotating blade drum 104.

FIG. 2 shows the shears 100 of FIG. 1 in conjunction with a device 1 according to the invention for changing the blade 102. The device 1 here comprises an adjusting member 10 which is fastened in a form-fitting manner to the outer side 105 of the blade drum 104, namely to the contact block 114. The adjusting member 10 has an actuating pin 12 which is movable in the direction of the longitudinal axis L of the tie rod 108. Specifically, the actuating pin 12 can be moved in the direction of the arrow "B", namely in an opposed manner to the pretensioning direction of the tie rod 108, in order thereby to be able to override the clamping between the clamping piece 118 and the blade 102 and subsequently to remove the blade 102 from the blade drum 104. The removal direction of the blade 102, for removal from the blade drum 104, is symbolized by the arrow "C" in FIG. 2.

In the embodiment shown in FIG. 2, the adjusting member 10 is designed as a hydraulic cylinder 14, wherein the actuating pin 12 of the device 1 is connected to a piston 16 of the hydraulic cylinder 14. If an oil chamber 18 of the hydraulic cylinder 14 is charged with pressure or oil, the piston 16 in conjunction with the actuating pin 12 is moved in the direction of the tie rod 108—to the right in the illustration of FIG. 2. As a consequence thereof, an end side of the actuating pin 12 enters into contact with an adjacent end side of the base element 112, as a result of which the tie rod 108 is displaced in the bore 110 counter to the pretensioning exerted by the disk spring 106, in such a manner that the clamping between the clamping piece 118 and the blade 102 is overridden. The blade 102 can subsequently then be taken out of the blade drum 104 in the direction "C" and therefore removed or changed.

When installing a new blade 102, after the blade 102 has been brought into position on the blade drum 104 and into contact with the clamping piece 118, the oil chamber 18 of the hydraulic cylinder 14 is adjusted to be unpressurized, and therefore the pretensioning of the disk spring 106 then brings about a movement of the tie rod 108 in the direction "A" (cf. FIG. 1) and, as a result, leads to automatic secure clamping of the blade 102 on the blade drum 104.

Inwardly projecting webs 20 are formed on an outer side of the hydrlaic cylinder 14 and can be brought into engagement with a shoulder portion 120 formed on the contact block 114. By this means, a form-fitting fastening of the hydraulic cylinder 14 to the contact block 114 is possible, as a result of which the device 1 can be attached to the outer side 105 in a short time. It should be pointed out in this regard that such a fastening of the device 1 to the outer side 105 of the blade drum 104 only takes place temporarily, namely for the purpose of replacing the blade 102. This means that, after the blade 102 has been changed, the device 1 is removed again from the contact block 114 and taken away from the shears 100, and therefore normal operation of the shears 100 with a rotating blade drum 104 takes place without incorporation of the device 1.

FIG. 3 shows a simplified lateral cross-sectional view of the invention according to a further embodiment. In this case, two bores 110 are formed in the blade drum 104, said bores running parallel to each other and each serving for receiving a tie rod 108 and a disk spring 106 attached to the latter. Blades 102 are in each case securely clamped on the blade drum 104 by means of the tie rods 108. The clamping mechanism corresponds in the same manner to the embodiment of FIG. 1 and FIG. 2, and therefore reference should be made thereto in order to avoid repetition.

In the embodiment of FIG. 3, the contact blocks 114 are attached in each case offset by 180° to one another to the outer side 105 of the blade drum 104. It is thereby possible to securely clamp the blades 102 to the blade drum 104 in a manner likewise offset by 180° to one another.

In the illustration of FIG. 3, the upper tie rod 108 is acted upon by the hydraulic cylinder 14, which is fastened to the contact block 114, in such a manner that—in the same manner as in the illustration of FIG. 2—the tie rod 108 is moved within the bore 110 in the direction of the arrow "B" in order to override the clamping between the blade 102 and the blade drum 104. For complete removal of the blade 102, the clamping piece 118 can be taken away from the tie rod 108, for example by means of a quarter turn fastening, after which the blade 102 is then fully exposed for a desired removal. The lower tie rod 108 is pretensioned in the direction of the arrow "A" by means of the pretensioning of the disk spring 106, as a result of which the blade 102 is clamped to the blade drum 104. It should be pointed out with regard to the lower tie rod 108 of FIG. 3 that a hydraulic cylinder 14 can likewise be fastened to the associated contact block 114 in order to bring about release of the blade 102 in the same manner as in the case of the above tie rod 108 of FIG. 3.

Figure 4:
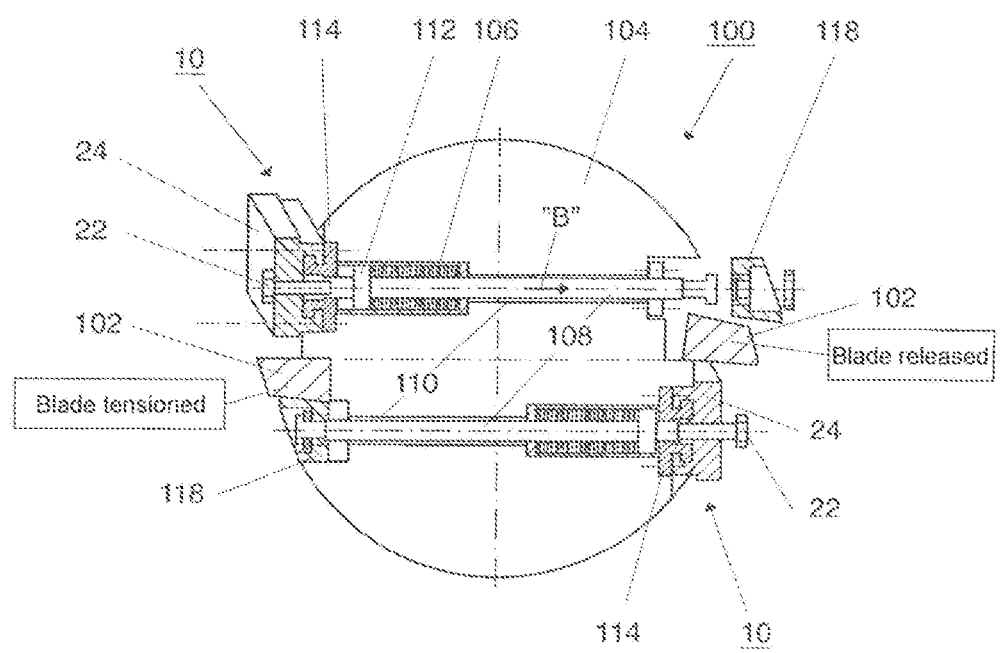
FIG. 4 shows a simplified lateral cross-sectional view of shears and a device for changing a blade on shears according to the present invention according to a further embodiment.

FIG. 4 shows a further embodiment of the invention, in which the actuating pin 12 of the actuating member 10 comprises a screw 22 which engages in an internal thread of a support plate 24. The support plate 24 has, on its outer side, webs 20, with which the support plate 24—in the same manner as the hydraulic cylinder 14—can be fastened in a form-fitting manner to a contact block 114 on the outer side 105 of the blade drum 104.

In the embodiment of FIG. 4, two bores 110 running parallel to each other are formed in the blade drum 104—in the same manner as in the embodiment of FIG. 3—and therefore blades 102 can be attached or clamped to the blade drum 104 in a manner offset at an angle of 180° to one another.

In order to release a blade 102, in the case of the embodiment of FIG. 4 the support plate 24 is fastened to a contact block 114 on the outer side 105 of the blade drum 104, and the screw 22 is subsequently screwed into the internal thread of the support plate 24 in such a manner that a free end side of the screw 22 enters into contact with the base element 112 and thereby moves the tie rod 108 within the bore 110 in the direction of the arrow "B". This is illustrated in FIG. 4 for the upper tie rod 108, wherein, after the clamping with the clamping piece 118 is overridden, the blade 102 can be removed from the blade drum 104. In the case of the lower tie rod 108 of FIG. 4, the screw 22 in the internal thread of the support plate 24 is unscrewed until the associated blade 102 (shown on the left in the region of the image) is securely clamped to the blade drum.

With regard to the adjusting member 10 according to the embodiment of FIG. 4, it should be pointed out that the support plate 24 thereof can preferably be fastened only temporarily to the contact block 114, namely for the purpose of replacing the blade 102. Accordingly, the blade drum 104 is set into rotation during normal operation of the shears 100 without the supporting plates 24 being fastened to the outer side 105 thereof.

It should be pointed out at this juncture that the embodiment of FIG. 4 is also suitable, because of its simplicity and discernible robustness, to be attached permanently to the blade drum 104.

Furthermore, it should be pointed out that a device 1 with an adjusting member 10 according to the embodiment of FIG. 4 can also be used in conjunction with shears 100, in which—in a departure from the illustration of FIG. 4—only one bore is formed in the blade drum 104.

Figure 5:
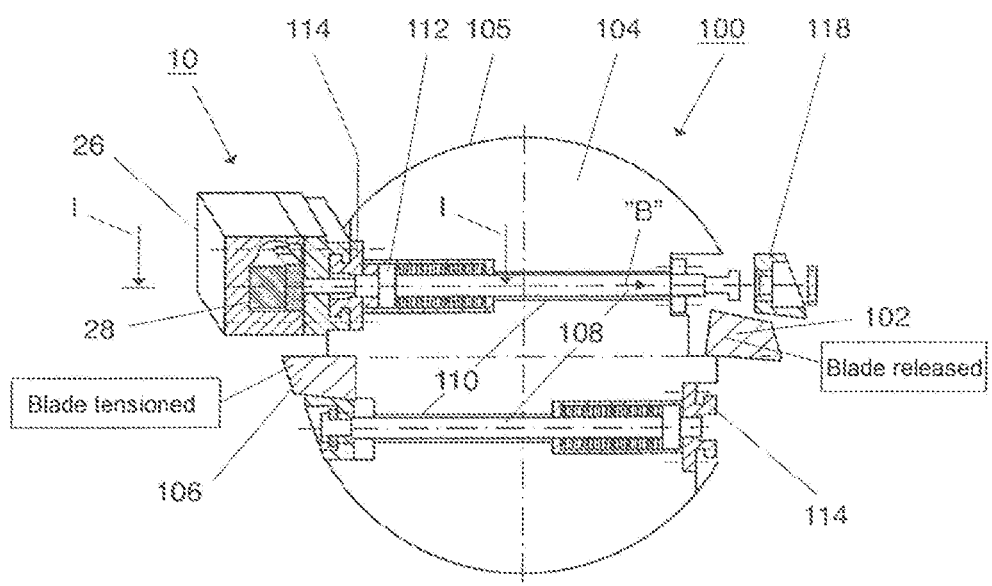
FIG. 5 shows a simplified lateral cross-sectional view of shears and a device for changing a blade on shears according to the present invention according to a further embodiment.

FIG. 5 clarifies a further embodiment of the invention, in which the adjusting member 10 has a housing 26 which is fastenable to a contact block 114 and in which a movable adjusting element 28 with a first wedge surface 30 is accommodated. In the same manner as in the embodiment of FIG. 4, two mutually parallel bores 110 are formed in the blade drum 104 and in which, as explained, the tie rods 108, which are set under pretension by disk springs 106, are accommodated. In the illustration of FIG. 5, the adjusting member 10 is fastened by way of example with its housing 26 to the contact block 114 which is assigned to the upper tie rod 108. Details regarding the configuration of the housing 26 and the adjusting element 28 accommodated therein emerge from the sectional view along the line "I-I", which is the basis for FIGS. 6a and 6b.

The adjusting element 28 is movable in the direction of the axis "D" within the housing 26. The adjusting element 28 has a first wedge surface 30. A second wedge surface 32 which is complementary to the first wedge surface 30 is formed on an end side of the actuating pin 12, which end side is opposed to the tie rod 108.

Figure 6A:
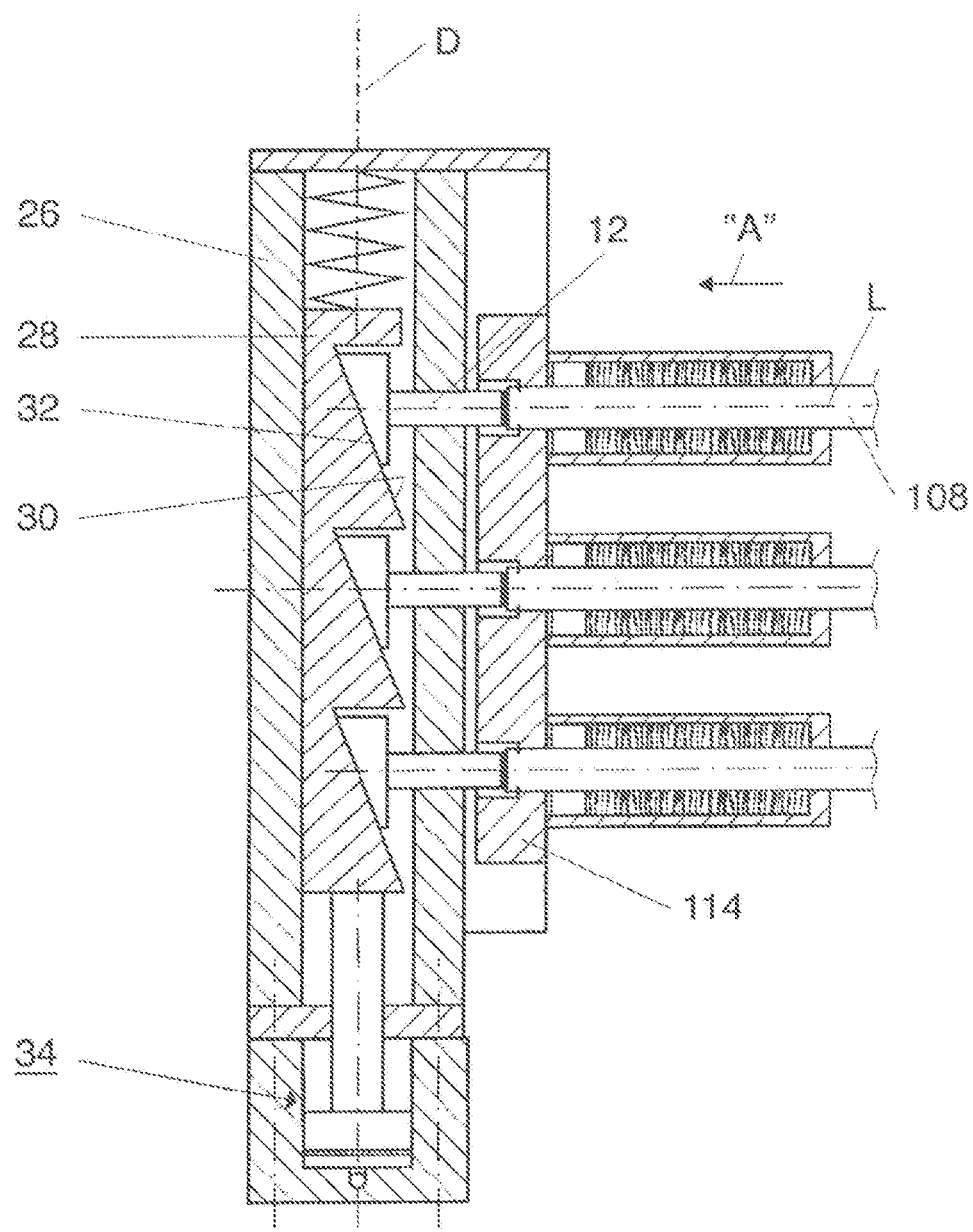
Figure 6B:
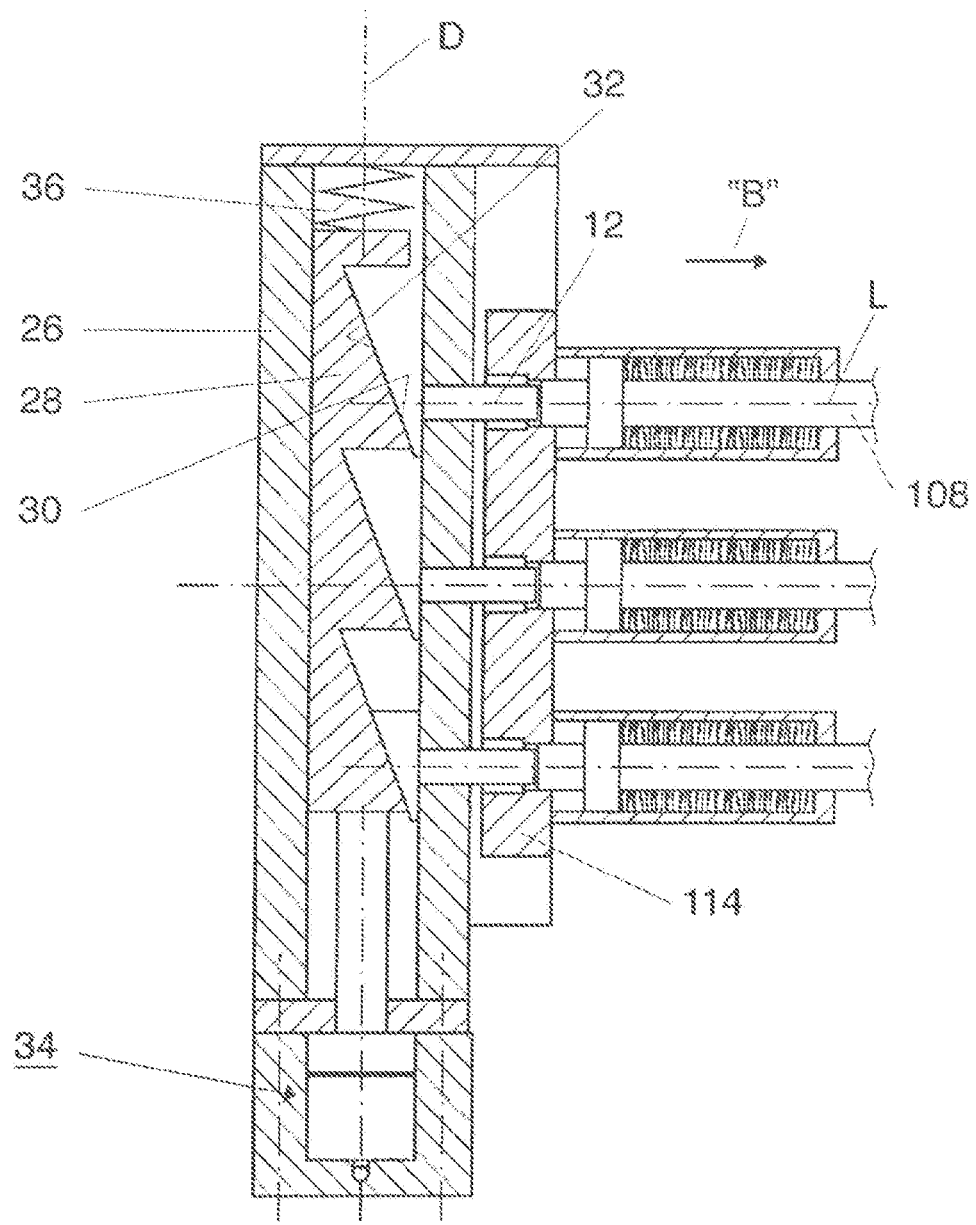
FIG. 6b show cross-sectional views of a fastening device of the device for changing a blade of FIG. 5.

FIG. 6a shows the adjusting member 10 in a starting position fastened to the contact block 114, in which the tie rod 108 is pressed in the direction of action "A" by means of the pretensioning exerted by the disk springs 106. The adjusting member 10 comprises an actuator 34 by means of which—as illustrated in FIG. 6b—the adjusting element 28 is moved along the axis D in such a manner that the actuating pin 12 is displaced in the process in the direction of action "B". The actuating element 28 is displaced here counter to the pretensioning of a spring 36. As a result thereof, the tie rod 108 is moved counter to the direction of its pretensioning within the bore 110 in order to override the clamping of the blade 102 to the blade drum 104. The actuator 34 can be a hydraulic cylinder or a screw having an identical effect. With regard to the relative displacement of the two wedge surfaces 30, 32, it is of importance that the axis D, along which the adjusting element 28 is displaced by the actuator 34, runs at a right angle to the longitudinal axis L of the tie rod 108.

In the embodiment according to FIG. 5, the adjusting member 10 for simplification is fastened by way of example only to the contact block 114 which is assigned to the upper tie rod 108. It goes without saying that the adjusting member 10 according to this embodiment can also be fastened to the contact block 114, which is assigned to the lower tie rod 108, for release of the blade 102.

Figure 7:
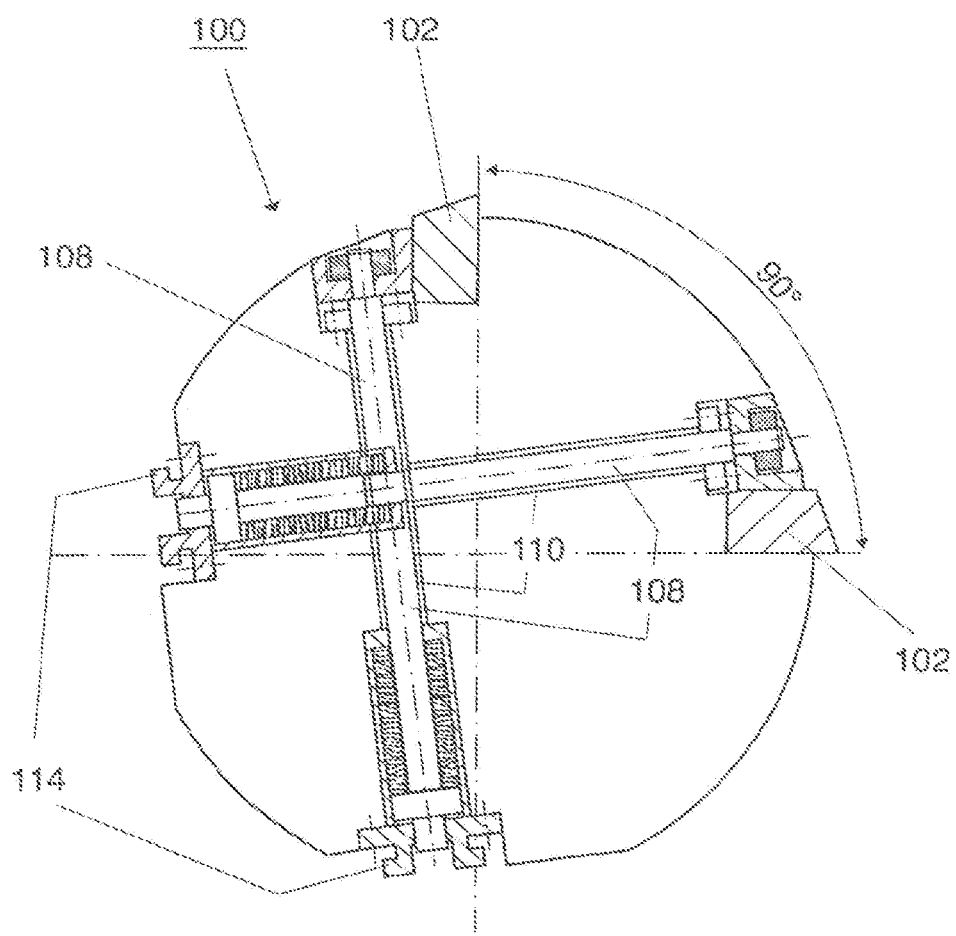
FIG. 7 shows a simplified lateral cross-sectional view of shears according to the invention according to a further embodiment.
Figure 8:
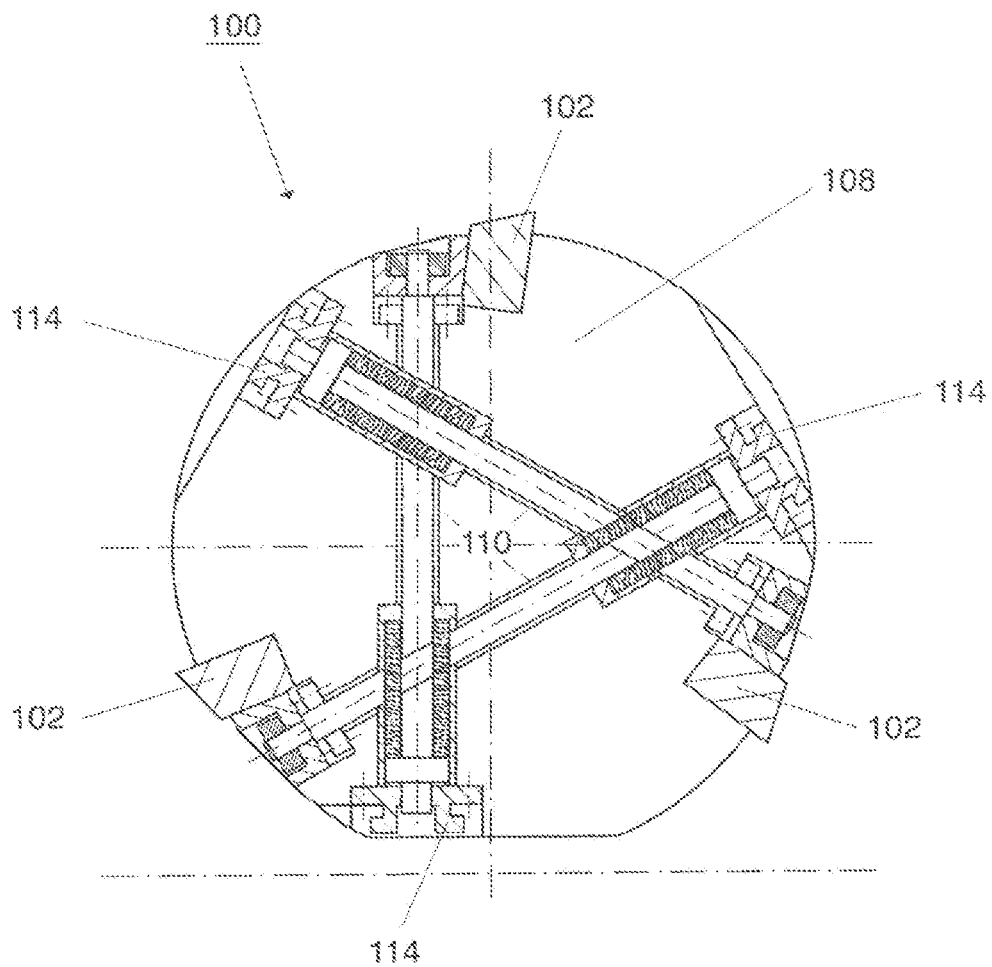
FIG. 8 shows a simplified lateral cross-sectional view of shears according to the invention according to a further embodiment.

It should be pointed out with regard to the bores 110 formed in the blade drum 104 that said bores can be formed not only parallel to one another but also offset at an angle of 90° to one another. This is illustrated in the simplified lateral cross-sectional view of FIG. 7. According to a further alternative embodiment of the invention, it can be provided that more than two bores 110, for example, as apparent from the illustration of FIG. 8, a total of three bores 110, are also formed in the blade drum 104. With regard to the bores 110 according to FIG. 7 and FIG. 8, it goes without saying that said bores are introduced in the blade drum 104 in a manner offset from one another, namely along a longitudinal axis of the blade drum 104 (perpendicular to the illustrative plane according to FIG. 7 and FIG. 8). It is possible by means of the plurality of bores 110 to clamp a plurality of blades 102 to the blade drum 104 at different angles from one another. This takes place by the same clamping and release mechanism as explained above, namely using a clamping piece 118 at one end of the tie rod 108 and a contact block 114 which is arranged on the outer side 105 of the blade drum 104 and to which the device 1 can be fastened, preferably temporarily, by its adjusting member 10.

In the case of the above embodiments, in order to release the blade 102 from the adjusting member, a compressive force is exerted on the tie rod 108 in order to be able to override the pretensioning thereof and subsequently remove the blade 102 from the blade drum 104.

Figure 9:
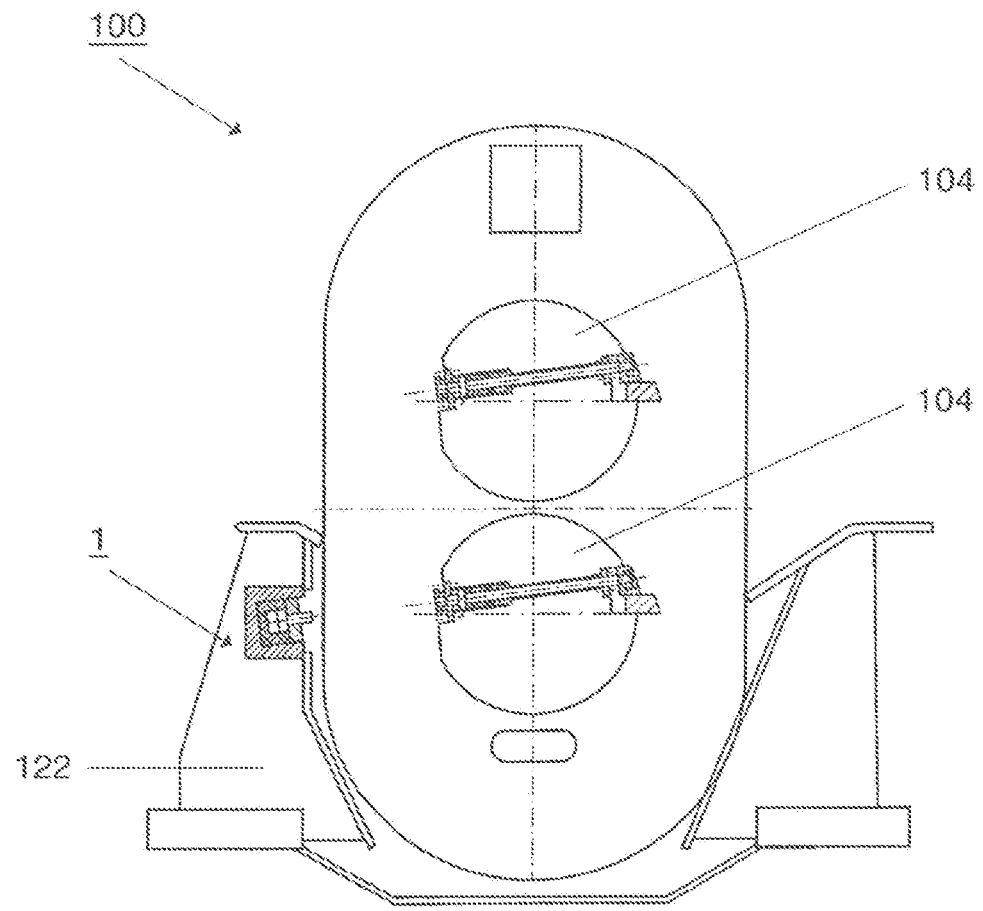
FIG. 9 shows a simplified lateral end side view, partially cut open, of shears and a device for changing a blade on shears according to the present invention according to a further embodiment.

FIG. 9 shows, in simplified form, an end side view of the shears 100 according to the invention, partially cut open, wherein the device 1 for changing at least one blade 102 of the shears 100 is attached to an outer support 122. Such an outer support can be designed, for example, in the form of an upright frame 122 and is always only referred to as such below—without any restriction being seen therein. The device 1 can be fastened here to the upright frame 122 either temporarily or permanently. According to FIG. 9, the shears 100 are in an operating position when there is no connection between the adjusting member 10 of the device 1 and a tie rod 108 accommodated in the blade drum 104.

Figure 10:
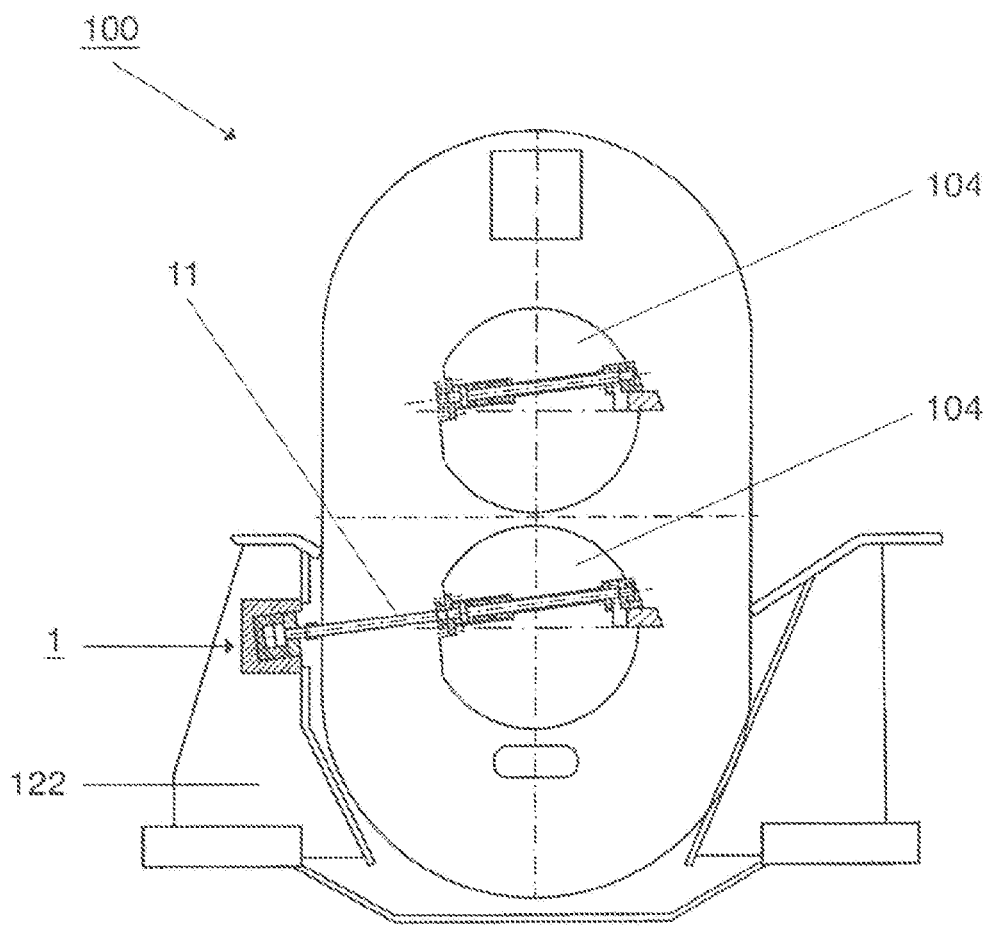
FIG. 10 shows the shears and the device of FIG. 10 in an operating state for changing a blade attached to the shears.

Irrespective of the manner of fastening the device 1 to the upright frame 122 according to FIG. 9, it is possible with such an arrangement of the device 1 to couple the adjusting member 10 by means of a connecting rod 11 to a tie rod 108, which is accommodated within the blade drum 104, by the connecting rod 11 being both fastened to a contact block 114 assigned to the tie rod 108 and being connected to the actuating pin 12. This is shown in the illustration of FIG. 10 with regard to the lower blade drum 104 which is positioned about its axis of rotation in such a manner that a longitudinal axis of the tie rod 108 is aligned with a connecting section in the direction of the adjusting member 10. After the connecting rod 11, as shown, between the adjusting member 10 and the contact block 114 has been attached to the outer side 105 of the blade drum 104, the actuation of the adjusting member 10 can be transmitted, in the same manner as explained above, by the connecting rod 11 to the tie rod 108 in order to move the tie rod 108 in the direction of action "B" in order to release the blades.

Figure 11:
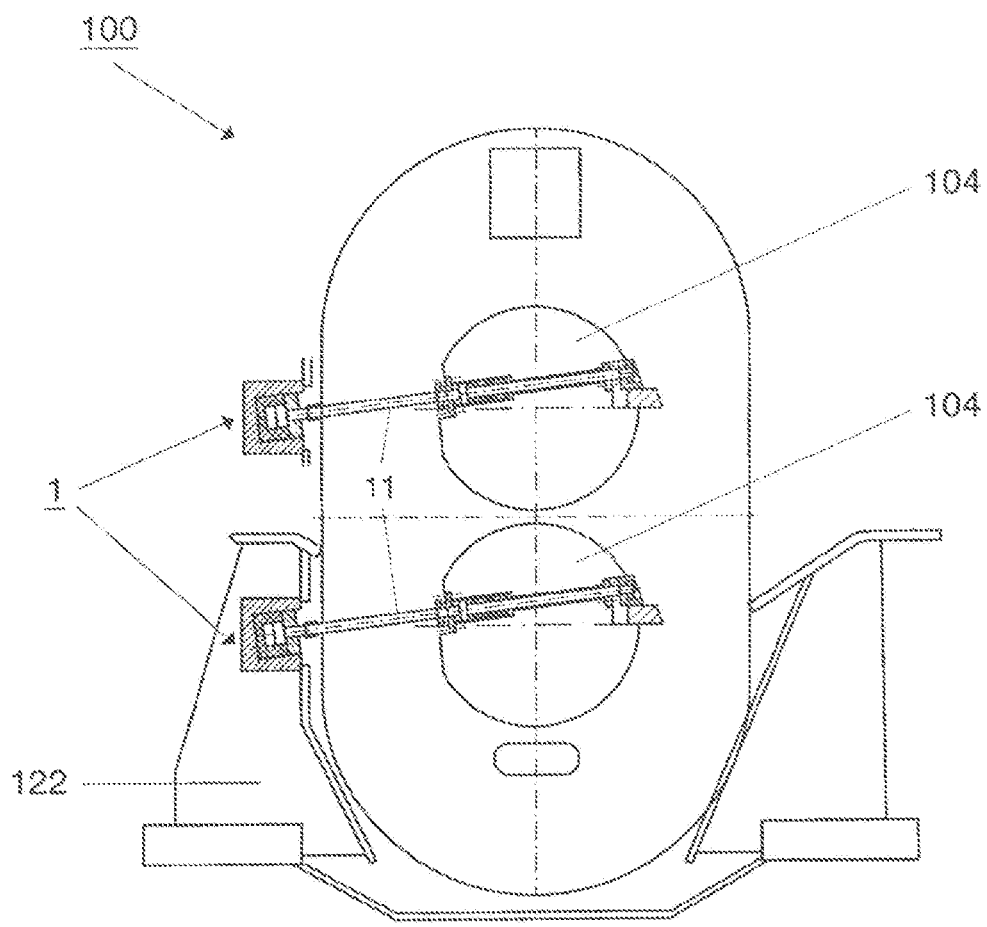
FIG. 11 shows a simplified lateral end side view, partially cut open, of shears and a device for changing a blade on shears according to the present invention according to a further embodiment, in an operating state for changing blades attached to the shears.

FIG. 11 shows a variant of the embodiment of FIG. 10, in which a separate device 1 is provided adjacent to the upper blade drum 104. This has the advantage that a change of the blades is possible simultaneously for the upper and lower measuring drums 104 of the shears 100.

With regard to the blades 102, it should be pointed out that said blades can have an elongate extent, for example in the form of a blade bar. Accordingly, for this case, a plurality of bores 110 are formed in a blade drum 104, said bores being formed along the center axis of the blade drum 104 in a row and parallel to one another. Then, as explained, a tie rod 108 for clamping the blade 102 is accommodated in each of said bores 110. In accordance with the longitudinal extent of the blade 102, the device 1 likewise has a longitudinal extent, with a plurality of adjusting members 10 which can each be fastened to the contact blocks 114 which are assigned to the individual bores 110. A rapid change of the blades 102, even in the form of blade bars, is thereby ensured.

With regard to all of the above-explained embodiments of the invention, it should be pointed out that the shears 100 can be used in a hot band mill for producing flat-rolled steel, and therefore serve for cutting band material or rolled band. The shears 100 can nonetheless also be used for cutting other materials.

Figure 12:
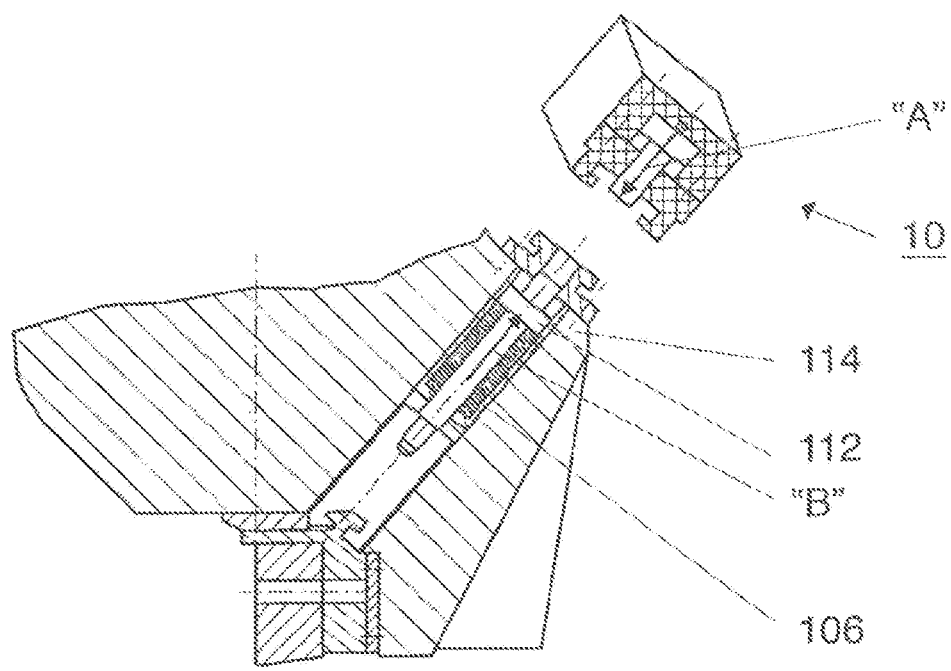
FIG. 12 shows a simplified lateral cross-sectional view of a further type of shears, in which the device according to the invention for changing a blade can be used.

FIG. 12 shows a variant of the embodiment of FIG. 1, in which the device 1 can be attached to the blade carrier of another type of shears, for the purpose of releasing a blade as explained above. This embodiment is suitable, for example, for pendulum shears and crank shears. Otherwise, the functioning principle of this embodiment is based on that of the embodiment of FIG. 2, and therefore reference should be made thereto in order to avoid repetition.

Figure 13:
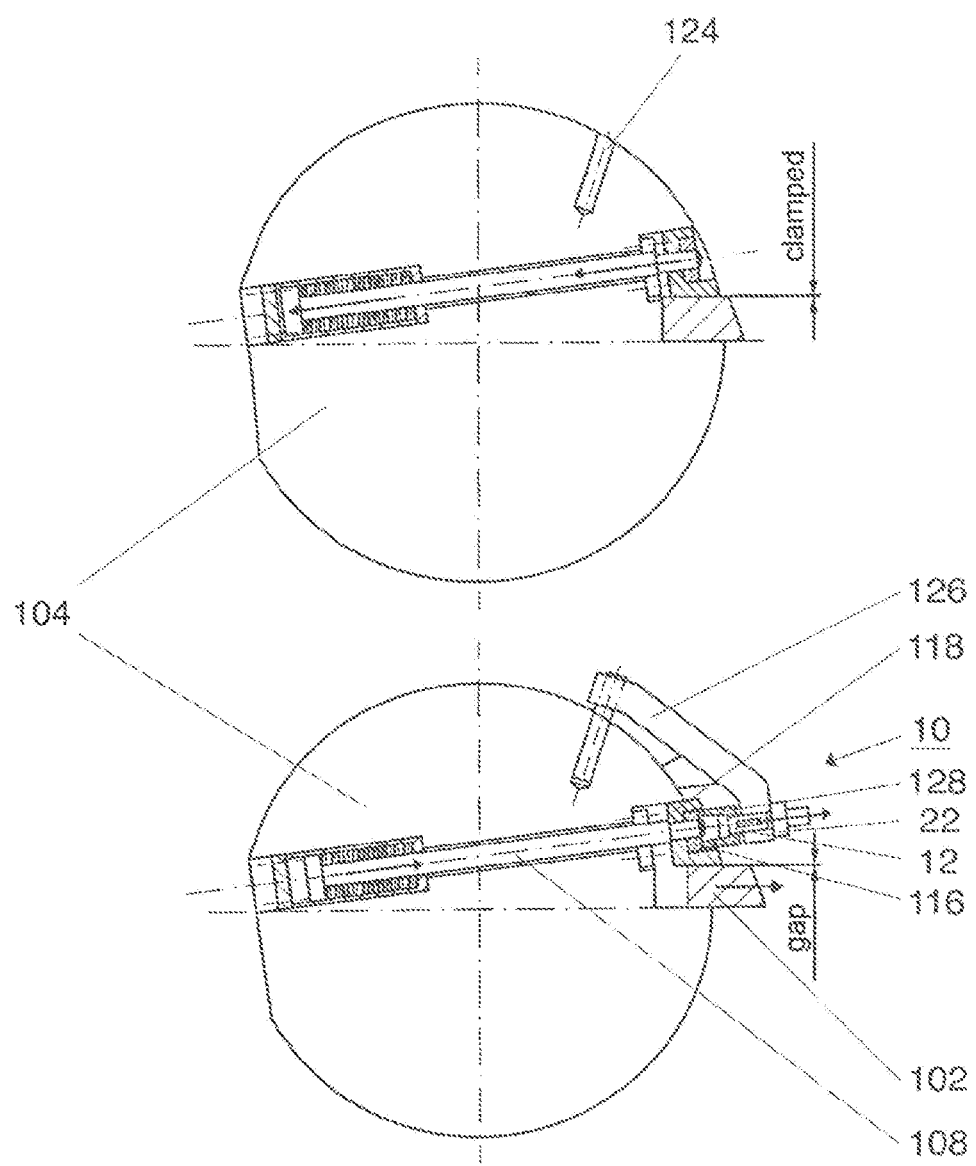
FIG. 13 shows a variant of the embodiment of the device according to the invention from FIG. 2.

FIG. 13 shows a variant of the embodiment of FIG. 2, in which the device 1 is designed in such a manner that a tensile force is exerted by the adjusting member 10 of the device 1 in order to override the pretensioning of the tie rod 108. In this case, a blind hole 124 (FIG. 13, illustration at the top) is formed in the measuring drum 104, into which blind hole a release clip 128 (FIG. 13, illustration at the bottom) can be introduced, to which the adjusting member 10 is attached. In this embodiment, the adjusting member can comprise a screw 22 which interacts with an actuating pin 12. The actuating pin 12 is coupleable, for example, in a form-fitting manner to an additional element 128 which can be connected, for example via a quarter turn connection, to the screw 116 of the tie rod 108, or alternatively to the clamping piece 118. In this manner, when the screw 22 is actuated, a tensile force can be applied to the tie rod 108, for the purpose of releasing the blade 102. It should be pointed out at this juncture, that in this embodiment, the adjusting member 10 can alternatively also be designed in the form of a hydraulic cylinder, as, for example, in the embodiment of FIG. 2.

LIST OF REFERENCES

1 Device
10 Adjusting member
11 Connecting rod
12 Actuating pin
14 Hydraulic cylinder
16 Piston
20 Form-fitting connecting rod
24 Supporting plate
28 Adjusting element
30 First wedge surface
32 Second wedge surface
34 Actuator
100 Shears
102 Blade
104 Blade carrier
105 Outer side
106 Force accumulator
108 Tie rod
110 Bore
112 Base element
114 Contact block
122 Form-fitting connecting rod
124 Blind hole
126 Release clip
128 Additional element
A Direction of action (axial direction) of the force accumulator 106
B Direction of action (axial direction) of the adjusting member 10
D Axis transversely with respect to the longitudinal axis
L Longitudinal axis

The invention claimed is:

1. A device for changing at least one blade on shears, the blade being automatically securable on a blade carrier by a tie rod that is pretensioned by a force accumulator, the device comprising an adjusting member which, for releasing the blade from the blade carrier, is actuable so as to move the tie rod in an axial direction in a manner opposed to the pretensioning, wherein the adjusting member is arrangable on an outer side of the blade carrier or outside the blade carrier, wherein the adjusting member includes a hydraulic cylinder and an actuating pin that is movable in a direction of a longitudinal axis of the tie rod and can be brought into contact bearing with an end side of the tie rod either directly or indirectly, wherein the actuating pin is connected to a piston of the hydraulic cylinder, arranged to move the actuating pin.

2. The device according to claim 1, wherein, for carrying out a blade change, the hydraulic cylinder is configured to be attachable to the blade carrier or is operatively connectable to the blade carrier by the connecting rod, wherein, after the blade change is finished, the adjusting member is releasable from the blade carrier.

3. The device according to claim 1, wherein the adjusting member or the connecting rod is fastenable to the blade carrier.

4. The device according to claim 3, wherein the adjusting member or the connecting rod is in positive-locking connection with the blade carrier.

5. The device according to claim 3, further comprising a contact block that fastens the adjusting member or the connecting rod to the blade carrier.

6. The device according to claim 1, wherein the adjusting member has an adjusting element with a first wedge surface that interacts directly or via the connecting rod with an end side of the actuating pin opposed to the tie rod.

7. The device according to claim 6, wherein a second wedge surface complementary to the first wedge surface is formed on the end side of the actuating pin opposed to the tie rod.

8. The device according to claim 6, further comprising an actuator that moves the adjusting element along an axis transversely with respect to the longitudinal axis of the tie rod in order to move the actuating pin in a direction of action along the longitudinal axis of the tie rod and counter to the pretensioning of the force accumulator in order to release the blade.

9. The device according to claim 1, further comprising at least one outer support to which the at least one adjusting member is attached, wherein the adjusting member is coupleable via the connecting rod to the tie rod, which is accommodated in the blade carrier of the shears, and therefore an actuation of the adjusting member is transmitted by the connecting rod to the tie rod.

10. The device according to claim 9, wherein a plurality of the adjusting members are attached to the outer support, said adjusting members each being coupleable via connecting rods to the tie rods accommodated in the blade carriers.

11. The device according to claim 1, comprising a plurality of the adjusting members arranged in a row on the outer side of the blade carrier, along a center axis of a blade drum.

12. The device according to claim 1, wherein the adjusting member is configured to exert a compressive force on the tie rod in order to release the blade from the blade carrier by neutralizing the prestressing of the tie rod.

13. The device according to claim 1, wherein the adjusting member is configured to exert a tensile force on the tie rod in order to release the blade from the blade carrier by neutralizing the prestressing of the tie rod.

14. A combination comprising:
   shears with at least one replaceable blade, comprising; at least one blade carrier on which a blade is automatically secured by a tie rod pretensioned by a force accumulator and movably accommodated in a bore formed in the blade carrier; and
   a device according to claim 1 for changing the at least one blade.

15. The combination according to claim 14, wherein the blade carrier has, on an outer side and as an extension of a longitudinal axis of the tie rod, at least one contact block to which the adjusting member or a connecting rod coupleable to the adjusting member is fastenable.

16. The combination according to claim 14, wherein the shears are rotating shears and the blade carrier is a blade drum.

17. The combination according to claim 16, wherein a plurality of blades are attached to the blade drum, wherein the tie rods assigned to the respective blades run at different angles to one another and bores in the blade drum for the tie rods are each introduced in an offset manner.

18. The combination according to claim 16, wherein at least two blades or pairs of blades are fastened to the blade drum, wherein associated tie rods of the blades run parallel to one another within the blade drum, and the blades or pairs of blades are arranged on the blade drum at an angle.

19. The combination according to claim 18, wherein the blades or parts of blades are arranged on the blade drum at an angle of 90° or 180° to one another.

* * * * *